US008890833B2

(12) United States Patent
You

(10) Patent No.: US 8,890,833 B2
(45) Date of Patent: Nov. 18, 2014

(54) TOUCH SCREEN DISPLAY DEVICE AND METHOD FOR CONTROLLING THE SAME

(75) Inventor: Bong-hyun You, Yongin-si (KR)

(73) Assignee: Samsung Display Co., Ltd. (KR)

( * ) Notice: Subject to any disclaimer, the term of this patent is extended or adjusted under 35 U.S.C. 154(b) by 903 days.

(21) Appl. No.: 12/239,664

(22) Filed: Sep. 26, 2008

(65) Prior Publication Data

US 2009/0096764 A1  Apr. 16, 2009

(30) Foreign Application Priority Data

Oct. 15, 2007 (KR) .................. 10-2007-0103580

(51) Int. Cl.
G06F 3/045 (2006.01)
G06F 3/041 (2006.01)

(52) U.S. Cl.
CPC .............. G06F 3/0412 (2013.01); G06F 3/045 (2013.01)
USPC ........................................ 345/174

(58) Field of Classification Search
CPC .............. G09G 3/36; G09G 5/00; G06F 3/04; G06F 3/041; G08C 21/00
See application file for complete search history.

(56) References Cited

U.S. PATENT DOCUMENTS

2003/0222857 A1* 12/2003 Abileah .................. 345/173
2006/0109222 A1*  5/2006 Lee et al. ................. 345/88
2007/0089914 A1   4/2007 Yang et al.
2008/0158199 A1*  7/2008 Lee et al. ................ 345/174

FOREIGN PATENT DOCUMENTS

| JP | 2001-42296 | 2/2001 |
| JP | 2002-149085 | 5/2002 |
| JP | 2003-256139 | 9/2003 |
| JP | 2004-295281 | 10/2004 |
| KR | 2001-0045029 | 6/2001 |
| KR | 2002-0080160 | 10/2002 |
| KR | 2004-0022354 | 3/2004 |
| KR | 10-0451773 | 5/2004 |
| KR | 2006-005633 | 5/2006 |
| KR | 2006-0041023 | 5/2006 |
| KR | 2007-0000764 | 1/2007 |

* cited by examiner

Primary Examiner — Tony N Ngo
(74) Attorney, Agent, or Firm — Innovation Counsel LLP

(57) ABSTRACT

A display device includes a first insulating substrate, a plurality of sensing lines extending in a first direction on the first insulating substrate and disposed at predetermined intervals thereon, a second insulating substrate facing the first insulating substrate, a plurality of sensing spacers disposed on the second insulating substrate and operable to make electrical contact with corresponding sensing lines in response to an external pressure applied thereto, and a sensing controller that detects the resistance of a contact closed loop formed by at least two sensor contacts making contact with a pair of corresponding sensing lines and determines the position of the contacted sensing lines in the first direction from the resistance detected.

9 Claims, 10 Drawing Sheets

TOUCH SCREEN DISPLAY DEVICE AND METHOD FOR CONTROLLING THE SAME

RELATED APPLICATIONS

This application claims priority of Korean Patent Application No. 10-2007-0103580, filed Oct. 15, 2007, the entire disclosure of which is incorporated herein by reference.

BACKGROUND

1. Field of the Invention

The present invention relates to a display device, and more particularly, to a display device with a touch screen.

2. Related Art

Display devices that have a touch screen function typically include a touch panel by which a user can select among items displayed on a screen of the display with his or her finger or a pen or other type of stylus.

Recently, there has been an increase in the use of display devices having touch panels because they do not require an additional input device, such as a keyboard and a mouse to select content displayed on the display panel.

The touch panels used in such displays may be classified into external types that are externally attached, e.g., to a top of the display panel, and built-in types that are integrated within the display panel, and which recognize a touch position using pressure and resistance changes or the like.

Built-in touch panels typically include a plurality of X axis sensing lines formed at predetermined intervals along a data line in a pixel region of the display panel, and a plurality of Y axis sensing lines formed at predetermined intervals along a gate line therein, which are used to detect a position that is touched on the panel in a matrix method. Thus, if the user presses a selected point on the screen of the display panel, the position of the point touched in terms of its X and Y coordinates are detected by the particular X and Y axes lines located at that point.

However, display devices having conventional built-in touch panels that include the pluralities of intersecting X and Y axes sensing lines, as well and a plurality of sensing electrodes connected to the respective sensing lines, typically suffer from a reduced pixel aperture ratio and increased manufacturing costs.

SUMMARY

In one exemplary embodiment, a display device comprises: A first insulating substrate; a plurality of sensing lines extending in a first direction on the first insulating substrate and disposed at predetermined intervals; a second insulating substrate facing the first insulating substrate; a plurality of sensing spacers disposed on the second insulating substrate and making electrical contact with the sensing lines when an external pressure is applied thereto; and a sensing controller that detects a resistance of a contact closed loop formed by the two sensing lines and the sensing spacers in contact with each other, and that detects a position of the contacted sensing lines in the first direction when the sensing spacers contact at least two of the plurality of sensing lines.

A first part of the plurality of sensing lines may be connected to the sensing controller, and a second part of the plurality of sensing lines may be connected to each other.

The sensing controller may detect a position of the sensing lines in the first direction by comparing a resistance of a reference closed loop formed by two sensing lines while the sensing spacers are not in contact with the sensing lines and the resistance of the contact closed loop.

A first part of the plurality of sensing lines may be connected to the sensing controller, and a second part of the plurality of sensing lines may not be connected to each other, and the sensing controller may detect the position of the sensing lines in the first direction by comparing the resistance of the two sensing lines while the sensing spacers are not in contact with the sensing lines and the resistance of the contact closed loop.

A common electrode may be formed on the second insulating substrate and the plurality of sensing spacers may be connected with the common electrode.

The sensing spacers may comprise a spacer having a predetermined height, and a contact electrode made of a conductive material formed in an external part of the spacer and connected to the common electrode.

The display device may further comprise a plurality of sensing electrodes connected with the sensing lines, wherein the sensing spacers are contactable to the sensing electrodes.

The display device may further include a plurality of pixel electrodes formed on the first insulating substrate and a plurality of thin film transistors formed on the first insulating substrate and respectively connected to the pixel electrodes, and the sensing electrodes and the thin film transistors may be formed in different regions.

The display device may further a plurality of pixel electrodes formed on the first insulating substrate, and a plurality of gate lines and a plurality of data lines formed on the first insulating substrate and intersecting each other, and the first direction may correspond to the direction of either the data lines or the gate lines.

The plurality of sensing lines may be arranged at predetermined intervals in a second direction substantially perpendicular to the first direction, and the sensing controller may detect the sensing lines contacting the sensing spacers to detect a position of the contacted sensing lines in the second direction.

In another exemplary embodiment, a method for controlling a display device having first and second insulating substrates facing each other comprises: Providing a plurality of sensing lines that extend in a first direction on the first insulating substrate and that are arranged at predetermined intervals; providing a plurality of sensing spacers on the second insulating substrate that make electrical contact with the sensing lines by means of an external pressure applied thereto; detecting a resistance of a contact closed loop formed by two sensing lines and the sensing spacers contacting each other; and, detecting a position of the contacted sensing lines in the first direction when the sensing spacers contact at least two of the plurality of sensing lines.

A first part of each sensing line may be connected to a sensing controller operable to determine the position of the contacted sensing lines in the first direction from the resistance detected, and a second part of each sensing line may be connected to the second parts of the other sensing lines.

The control method may further include detecting the resistance of a reference closed loop formed by the corresponding pair of sensing lines when they are not in contact with the at lest two sensing spacers, and the determining of the position of the contacted sensing lines in the first direction comprises comparing the resistance of the contact closed loop with the detected resistance of the reference closed loop.

A first part of each sensing line may be connected to a sensing controller operable to determine the position of the contacted sensing lines in the first direction from the resistance detected, and a second part of each sensing line may be not connected to the second parts of the other sensing lines.

The control method may further include detecting the resistance of a reference closed loop formed by the corresponding pair of sensing lines when they are not in contact with the at lest two sensing spacers, and the determining of the position of the contacted sensing lines in the first direction may include comparing the resistance of the contact closed loop with the resistance of the reference closed loop.

The sensing lines may be arranged at predetermined intervals in a second direction substantially perpendicular to the first direction, and the method may further include detecting a position of the contacted sensing lines in the second direction by detecting the contacted sensing lines n contact with the at least two sensing spacers with the sensing controller.

A better understanding of the above and many other features and advantages of the novel touch screen display panels and methods for controlling them of the present invention may be obtained from a consideration of the detailed description of some exemplary embodiments thereof below, particularly if such consideration is made in conjunction with the several views of the appended drawings, wherein like elements are referred to by like reference numerals throughout.

DETAILED DESCRIPTION

Figure 1:
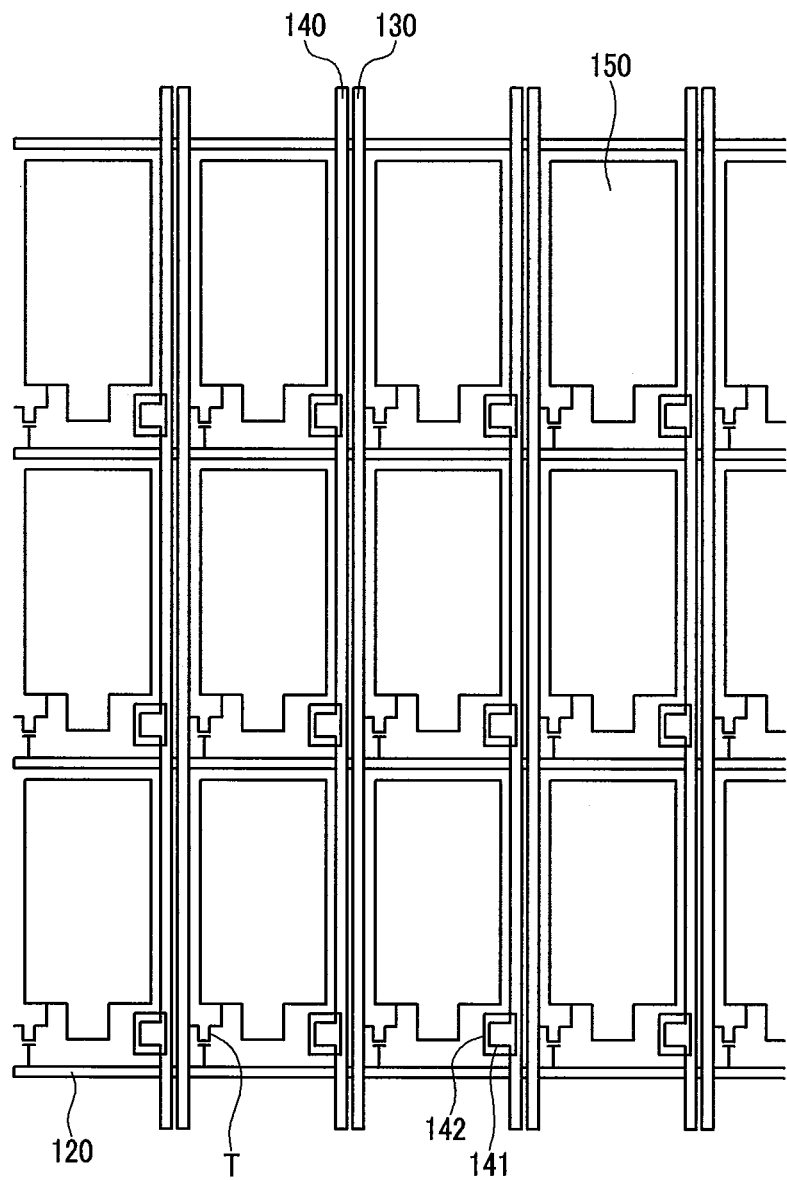
FIG. 1 is a partial top plan view of a first exemplary embodiment of a display device in accordance with the present invention, showing a group of pixel areas thereof.

In the following description, a liquid crystal display (LCD) type of device is described as an example of a display device to which the present disclosure has advantageous application, and accordingly, an LCD panel is described as an example of the type of display panel used therein. However, it should be understood that the present invention is not limited to LCD devices, and may also be advantageously applied to other types of display devices, such as organic light emitting device (OLED) and electrophoretic display devices.

First Exemplary Embodiment

As illustrated in FIGS. 1 to 4, a first exemplary embodiment of a display device 1 in accordance with the present invention includes a first substrate assembly 100 having a first insulating substrate 110, a second substrate assembly 200 having a second insulating substrate 210, and a liquid crystal layer 300 interposed between the first and second substrates assemblies 100 and 200.

The first exemplary display device 1 further includes a plurality of sensing lines 140 that extend in a predetermined first direction on the first insulating substrate 110, a plurality of sensing spacers 250 that make electrical contact with the sensing lines 140 in response to the application of an external pressure on the second insulating substrate 210, and a sensing controller 530 that is connected to the sensing lines 140, and which is operable to detect the position of the sensing lines 140 that are in contact with the sensing spacers 250.

FIG. 1 is a partial top plan view of the first exemplary display device 1. As illustrated therein, the display device 1 includes a plurality of pixel electrodes 150 formed on the first insulating substrate 110, a plurality of intersecting gate and data lines 120 and 130 respectively disposed between pairs of adjacent of pixel electrodes 150, and a plurality of thin film transistors T respectively connected to corresponding data lines 130, gate lines 120 pixel electrodes 150. The display device 1 further includes a plurality of sensing electrodes 142 respectively connected to the sensing lines 140.

The sensing lines 140 extend in the first direction on the first insulating substrate 110 and are disposed at predetermined intervals thereon. In one exemplary embodiment, the sensing lines 140 extend in a longitudinal direction corresponding to that of the data lines 130 and are respectively disposed between pairs of adjacent pixel electrodes 150. That is, the "first direction" may refer to the longitudinal direction of the data lines 130, and the predetermined intervals between the sensing lines 140 are slightly larger than the respective widths of the pixel electrodes 150 disposed between the data lines 130. However, it should be understood that the "first direction" is not limited to that described above, and may instead refer to the lateral direction in which the gate lines 120 extend. Additionally, the predetermined intervals, or pitch, between the lines may be larger than the width of an integer number of the pixel electrodes 150. That is, the sensing lines 140 may extend in either the lateral or the longitudinal direction, and one or more pixel electrodes 150 may be disposed between a pair of adjacent sensing lines 140, depending on the sensing resolution desired.

The plurality of sensing lines 140 are arranged at predetermined intervals in a second direction substantially perpendicular to the first direction. For example, if the first direction is a lengthwise direction of the data lines 130, the second direction is a lengthwise direction of the gate lines 120.

Each of the sensing lines 140 includes a conductive material and has a predetermined resistance. The resistance of a sensing line 140 is proportional to its length. The sensing lines 140, like the gate lines 120 and the data lines 130, may include molybdenum, aluminum, chrome or an alloy thereof. Thus, the respective resistances of the sensing lines 140 may differ, depending on the materials thereof, and are in proportion to their respective lengths, regardless of the materials thereof. For example, if the length of a sensing line 140 doubles, its resistance will also double.

A first part of each sensing line 140 is connected to the sensing controller 530, while a second part is connected to the other sensing lines 140. In this case, a pair of adjacent sensing lines 140 forms a closed loop, as illustrated by the recurvate arrow A in FIG. 5.

Figure 3:
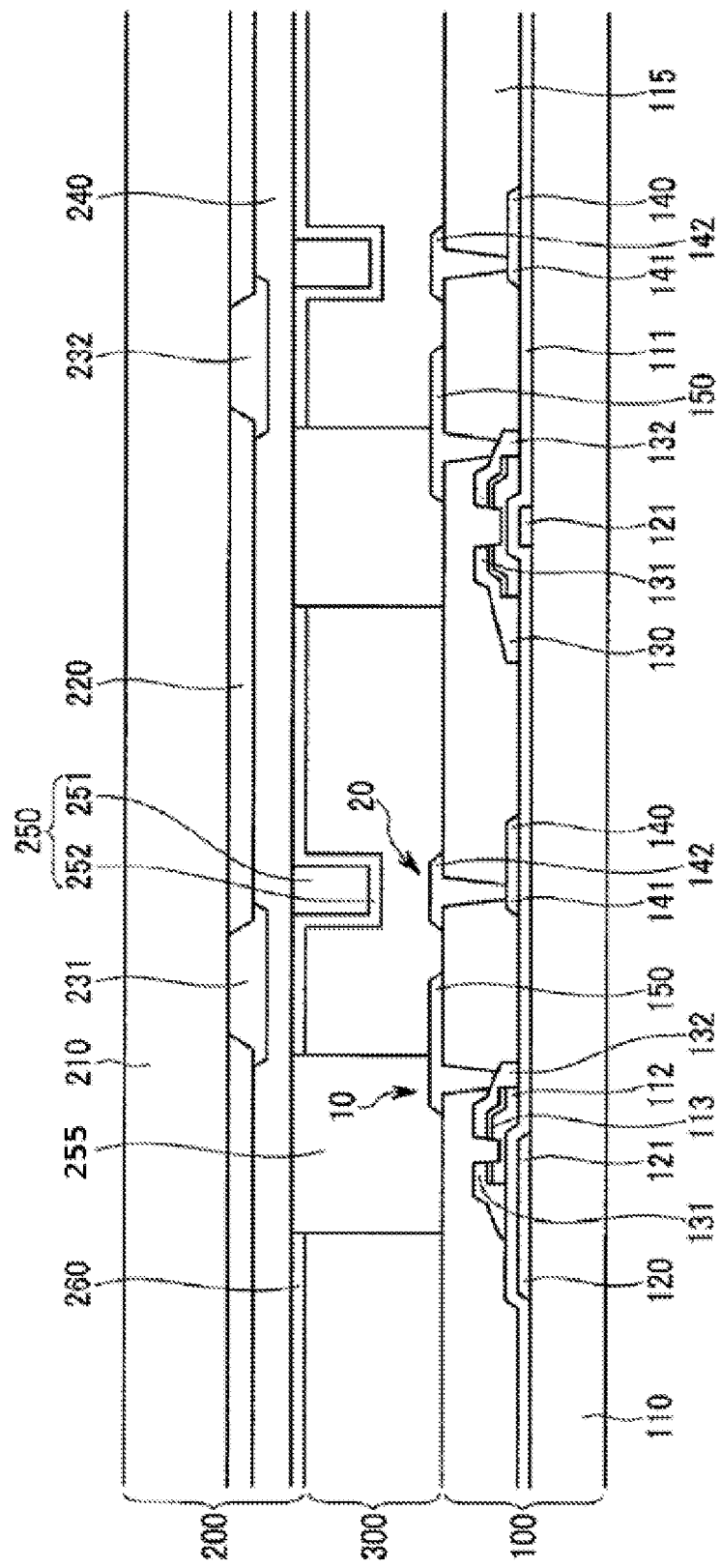
FIG. 3 is a partial cross-sectional view of the device of FIG. 2, as seen along the lines of the section III-III taken therein.

The thin film transistors T are respectively provided in a first part of the corresponding pixel electrodes 150, while the sensing electrodes 142 are respectively provided in a second part thereof. In particular, the sensing electrodes 142 are formed so as not to overlap the thin film transistors T. As illustrated in FIG. 3, sensing spacers 250, which are depressed by the application of an external pressure thereto so as to make contact with a corresponding sensing electrode 142, are formed over the sensing electrodes 142. Sensing line extension parts 141 that extend from the sensing lines 140 are respectively formed below the sensing electrodes 142 to transmit an electrical signal to the respective sensing lines 140.

Figure 2:
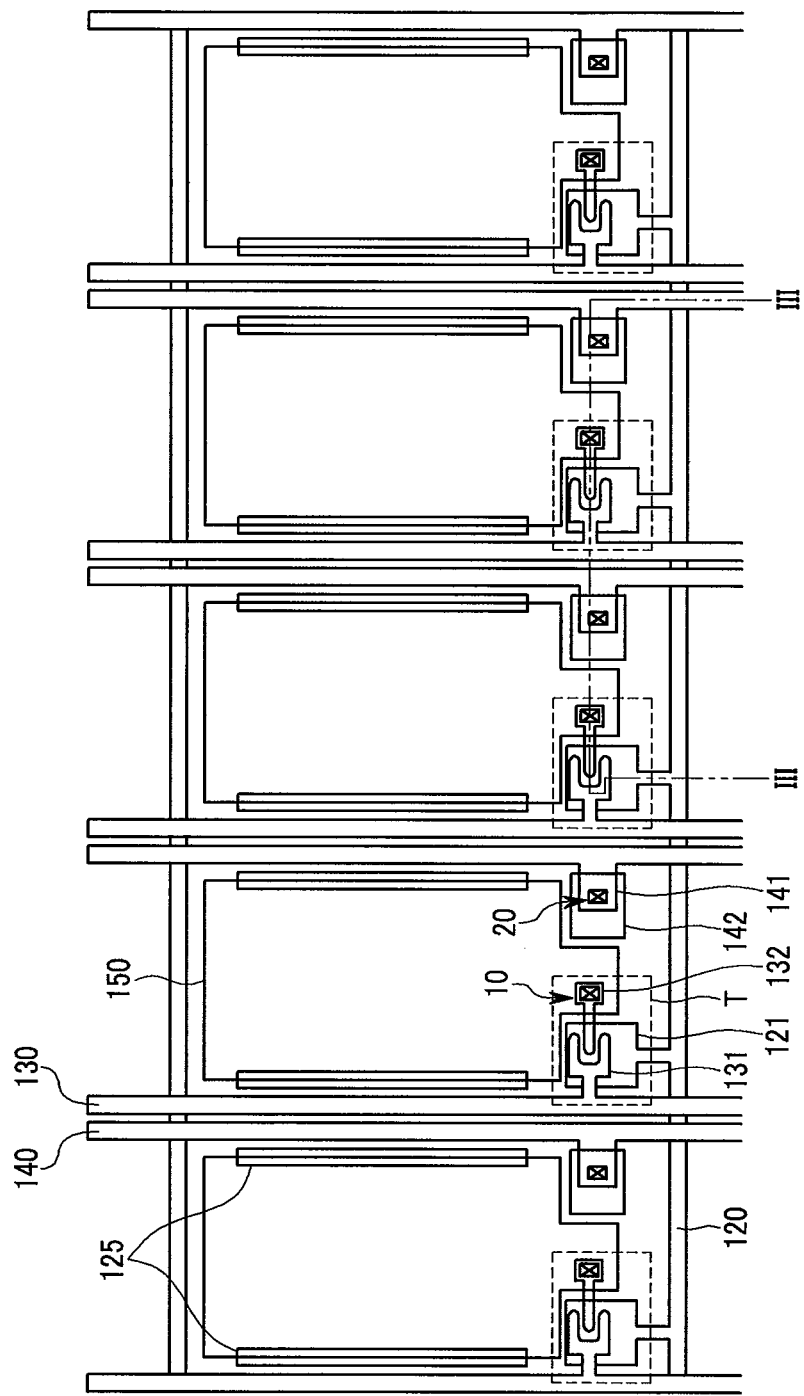
FIG. 2 is a partial enlarged top plan view of a portion of the pixels of the first exemplary display device of FIG. 1.

FIG. 2 is a partial enlarged top plan view of a portion of the first exemplary display device 1, and FIG. 3 is a partial cross-sectional view of the exemplary device of FIG. 2, as seen along the lines of the section III-III taken therein. Referring to FIGS. 2 and 3, an exemplary pixel of the first display embodiment is described in detail below.

Gate wires 120, 121 and 125 are formed on the first insulating substrate 110. Each of the gate wires 120, 121 and 125 may include a single or multiple layers of metal. Each gate wire 120, 121 and 125 includes a gate lines 120 extending in a transverse direction, gate electrodes 121 connected to the gate lines 120 and storage capacitance electrodes 125 extending parallel to the data lines 130.

The storage capacitance electrodes 125 extend alongside the data lines 130 and partially overlap the associated pixel electrodes 150. The storage capacitance electrodes 125 overlap the pixel electrodes 150 so as to form a storage capacitances, which serve to reduce the parasitic capacitances Cdp formed between the respective pixel electrodes 150 and data lines 130.

A gate insulating layer 111 that may include silicon nitride (SiNx) covers the gate wires 120, 121 and 125 on the first insulating substrate 110.

A semiconductor layer 112 including a semiconductor, such as amorphous silicon, is formed on the gate insulating layer 111. An ohmic contact layer 113, that may include silicide or hydrogenated amorphous silicon highly doped with an n-type dopant, is formed on the semiconductor layer 112.

Data wires 130, 131, 132, 140 and 141 are formed on the ohmic contact layer 113 and the gate insulating layer 111. The data wires 130, 131, 132, 140 and 141 may include one or more layers of metal. The data wires 130, 131, 132, 140 and 141 include data lines 130 intersecting the gate lines 120 and forming a pixel, source electrodes 131, drain electrodes 132, the sensing lines 140 formed in parallel with the data lines 130 and intersecting the gate lines 120, and the above sensing line extension parts 141 that extending from the sensing lines 140 and respectively formed in the respective positions of the sensing electrodes 142.

The data lines 130 alternate with the pixel electrodes 150. The source electrodes 131 branch out from the corresponding data line 130 and the drain electrode 132 is connected to the corresponding pixel electrode 150 through an associated contact hole 10 (see FIG. 2).

A passivation layer 115 is formed on the data wires 130, 131, 132, 140 and 141 and the portions of the semiconductor layer 112 not covered by the data wires 130, 131, 132, 140 and 141. Contact holes 10 and 20 formed in the passivation layer 115 respectively expose the drain electrodes 132 and the sensing line extension parts 141.

The pixel electrodes 150 and the sensing electrodes 142 are formed on the passivation layer 115. The pixel electrodes 150 typically include a transparent conductive material, such as ITO (indium tin oxide) or IZO (indium zinc oxide). The sensing electrodes 142 also include a transparent conductive material and are formed in the same layer as the pixel electrodes 150. The pixel electrodes 150 are substantially rectangular. As illustrated in FIG. 2, the thin film transistors T are formed at a corner of a lower part of the rectangle, while the sensing electrodes 142 are formed at the other lower corner thereof.

As may be seen in FIG. 3, if an external pressure is applied to the sensing spacers 250 from above, the sensing spacers 250 will make contact with the corresponding sensing electrodes 142. Preferably, the sensing electrodes 142 have an area that is sufficiently large to make good electrical contact with the sensing spacers 250 when the spacers are depressed.

The second substrate 200 of the first exemplary display 1 is described in more detail below.

A black matrix 220 is formed on a second insulating substrate 210. The black matrix 220 divides red, green and blue filters and blocks light from directly impinging of the thin film transistors T on the first substrate 100. The black matrix 220 typically includes a photoresist organic material to which a black pigment has been added. The black pigment may include carbon black. The black matrix 220 may include a metal material, such as chrome oxide.

Color filter layers 231 and 232 of different colors are formed on the second insulating substrate 210 corresponding to the respective pixel electrodes 150. The color filter layers 231 and 232 include red, green and blue filters that are formed in a repeating pattern in the opening of the black matrix 220. The color filter layers 231 and 232 imbue the white light emitted from a backlight unit (not shown) and passing through the liquid crystal layer 300 with a corresponding color. The color filter layers 231 and 232 typically include a photoresist organic material. Alternatively, the color filter layers 231 and 232 may be formed on the first substrate 100 instead of on the second substrate 200. The color filter layers 231 and 232 may be omitted, depending on the type of driving effected by the backlight unit.

An overcoat layer 240 is formed on the color filter layers 231 and 232 and the black matrix 220 not covered by the color filter layers 231 and 232. The overcoat layer 240 provides a planar surface and protects the color filter layers 231 and 232. The overcoat layer 240 typically includes an acrylic epoxy material.

The sensing spacers 250 that are depressed by the application of an external pressure thereto are formed on the overcoat layer 240. As above, the corresponding sensing electrodes 142 are formed on the first substrate 100 below the sensing spacers 250.

If a user applies a predetermined pressure to the second substrate 200, the sensing spacers 250 are pressed downward so as to make contact with the corresponding sensing electrodes 142. Each sensing spacer 250 include a spacer 251 shaped like a bar, and a contact electrode 252 that includes a conductive metal formed on the spacer 251. In one exemplary embodiment, the respective sensing spacers 250 contact a single sensing electrode 142, but the invention is not limited thereto. In an alternative embodiment, the respective sensing spacers 250 may simultaneously contact at least two sensing electrodes 142 disposed adjacent to each other.

A common electrode 260 is formed on the overcoat layer 240. The contact electrode 252 of the sensing spacers 250 is formed in the same layer as the common electrode 260 and are electrically connected to the common electrode 260.

The common electrode 260 includes a transparent conductive material, such as ITO or IZO. The common electrode 260 and the contact electrode 252 are formed in the same layer. The common electrode 260 and the contact electrodes 252 are formed by depositing a conductive material layer and then patterning the layer so as to remove it from areas where cell gap spacers are to be formed. The common electrode 260 acts together with the pixel electrodes 150 of the first substrate 100 to apply electric fields to the liquid crystal layer 300.

The cell gap spacers 255 are formed on the portions of the overcoat layer 240 not covered by the common electrode 260. The thin film transistors T are formed on the first substrate 100 below a corresponding cell gap spacer 255. The cell gap spacers 255 maintain a gap between the first substrate 100 and the second substrate 200. A liquid crystal material is injected between the first and second substrates 100 and 200 that are spaced from each other by the cell gap spacers 255. In the present embodiment, the cell gap spacers 255 and the sensing spacers 250 are formed in the same layer and by the same process. Alternatively, the cell gap spacers 255 may be formed in a different layer from the sensing spacers 250, such as layer of the common electrode 260.

The layer 300 of liquid crystal material interposed between the first substrate 100 and the second substrate 200 contains liquid crystal molecules.

Figure 4:
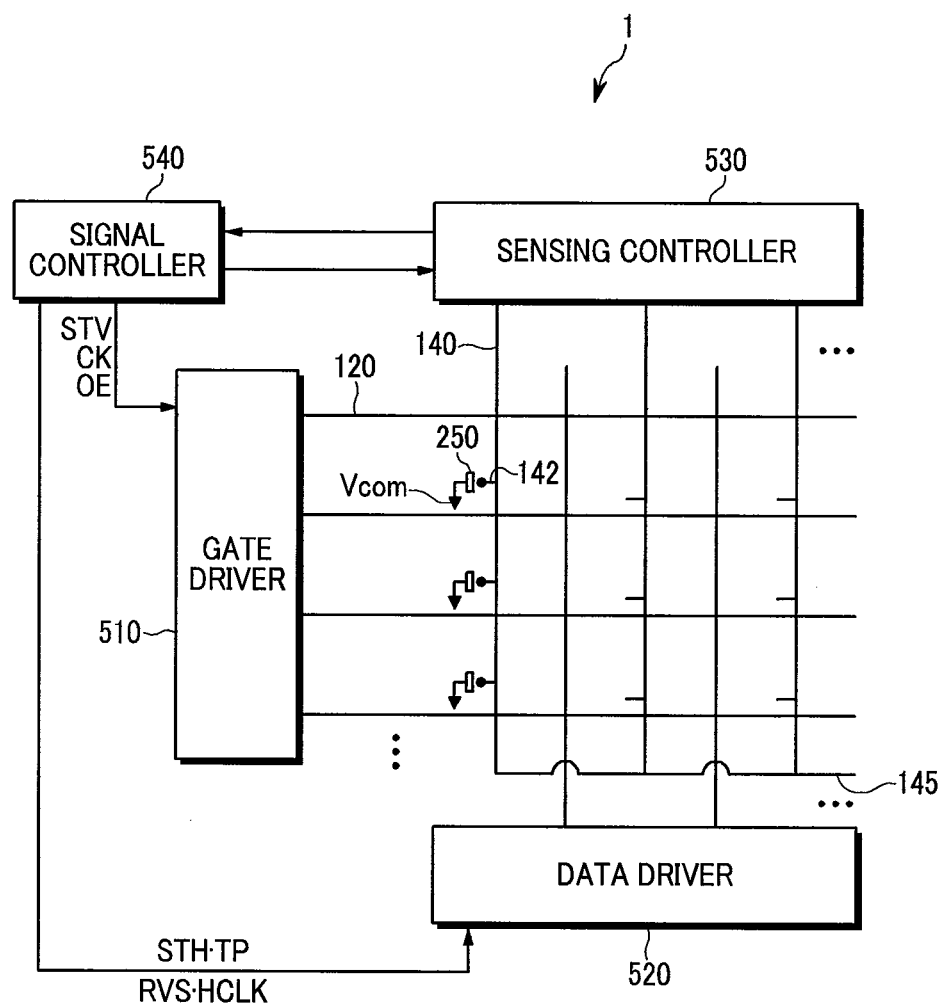
FIG. 4 is a partial schematic and control function block diagram of the first exemplary display, showing a sensing controller and a plurality of sensing lines thereof.

FIG. 4 is a partial schematic and control function block diagram of the first exemplary display 1. As illustrated therein, the display device 1 includes a gate driver 510 connected to the gate lines 120, a data driver 520 connected to the data lines 130, the sensing controller 530 connected to the sensing lines 140 and a signal controller 540 controlling the foregoing elements.

The signal controller 540 receives image signals and control input signals, e.g., a vertical synchronizing signal Vsync, a horizontal synchronizing signal Hsync, a main clock CLK and a data enable signal DE, from an external graphic controller to control the image signals to be displayed. The signal controller 540 generates a gate control signal and a data control signal based on the control input signals, and outputs the respective signals to the gate driver 510 and the data driver 520, respectively.

The gate control signal includes a vertical synchronization start signal STV to start outputting a gate-on voltage Von (high period of a gate signal), a clock CK to control the output timing of the gate-on voltage and a gate-on enable signal OE to limit the width of the gate-on voltage. The data control signal includes a horizontal synchronization start signal STH to start the input of data signals, a load signal LOAD or TP to apply corresponding data signals to the respective data lines 130, and a reverse control signal RVS to reverse the respective polarities of the data signal, and a data clock signal HCLK.

The gate driver 510 is sometimes referred to as a scan driver. The gate driver 510 is connected to the gate lines 120 and sequentially applies a gate signal combining a gate on voltage Von and a gate off voltage Voff (low period of a gate signal), to the gate lines 120. The gate driver 510 outputs the gate signal in accordance with control signals such as a vertical synchronization start signal STV and the clock CK signal output by the signal controller 540.

The data driver 520 is sometimes referred to as a source driver. The data driver 520 receives gray scale voltages from a gray scale voltage generator (not illustrated), selects a gray scale voltage and applies the selected voltage to the data lines 130 as a data signal in accordance with an external control.

The sensing controller 530 is connected to the plurality of sensing lines 140 and detects resistances of the sensing lines 140 that are making contact with the sensing spacers 250, thereby detecting the position of the sensing lines 140 making such contact.

Figure 6:
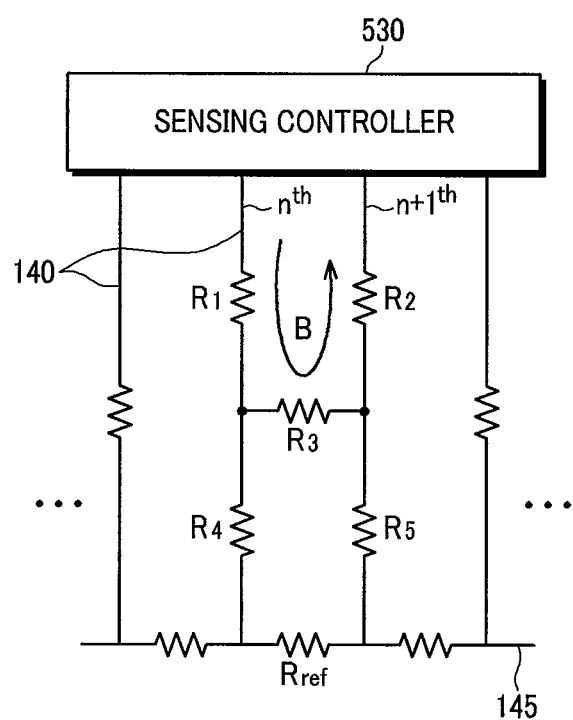
FIG. 6 is a partial schematic and control function diagram illustrating a resistance seen by the sensing controller when the sensing spacer is in contact with one of the sensing lines of FIG. 4.

The sensing controller 530 is connected to the sensing lines 140. As illustrated in FIG. 6, when at least one of the sensing spacers 250 makes contact with at least two of the sensing lines 140, the sensing controller 530 detects the resistance of a contact closed loop B formed by the two sensing lines 140 and the sensing spacer 250 making contact with each other to thereby detect the position in the first direction of the contacted sensing lines 140. That is, when a pair of adjacent sensing spacers 250 make contact with a corresponding pair of sensing electrodes 142 electrically connected to a pair of sensing lines 140, the sensing controller 530 detects the resistance of the contact closed loop B formed by the pair of sensing lines 140 and the pair of sensing spacers 250 contacting each other, as illustrated in FIG. 6.

In one embodiment of the present invention, a first part of each sensing line 140 is connected with the sensing controller 530, while a second part of each sensing line 140 is connected with the other sensing lines 140. That is, the second parts of the sensing lines 140 are connected with each other by a connection line 145. In this embodiment, the sensing controller 530 detects the resistance of a reference closed loop A formed by a pair of adjacent sensing lines 140 when none of the sensing spacers 250 is in contact with the two sensing lines 140. The connection line 145 may be formed in the same layer as the gate lines 120 and may be connected with the respective sensing lines 140 through a bridge (not illustrated) formed in the same layer as the pixel electrodes 150.

Figure 5:
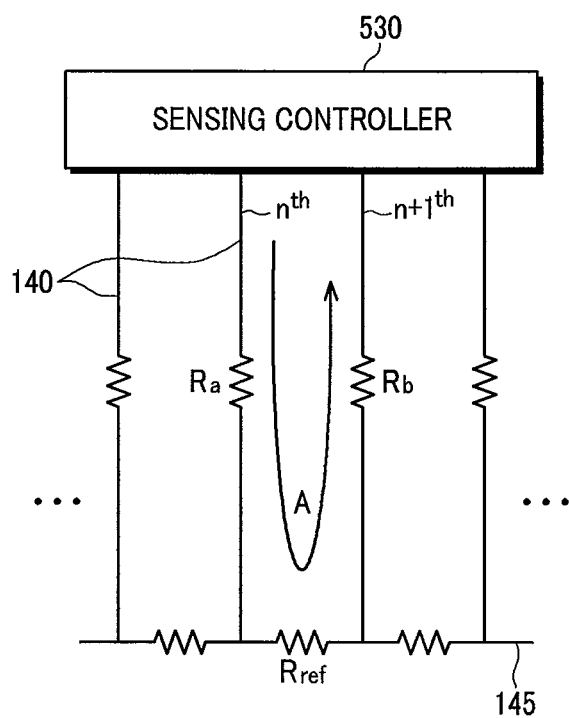
FIG. 5 is a partial schematic and control function diagram illustrating a resistance seen by the sensing controller of FIG. 4 when a sensing spacer of the display is not in contact with one of the sensing lines thereof.

As illustrated in FIG. 5, the resistance formed by the reference closed loop A is the value resulting from the combination of the resistance Ra of the nth sensing line 140, the resistance Rb of the (n+1)th sensing line 140, and the resistance Rref of the connection line 145 between the nth sensing line 140 and the (n+1)th sensing line 140.

When two sensing spacers 250 contact two neighboring sensing lines 140 as the result of an external pressure applied thereto, the contact closed loop B is formed by the two sensing lines 140 and the sensing spacers 250 disposed in contact with each other. The sensing controller 530 detects the resistance of the contact closed loop B.

As illustrated in FIG. 6, the resistance of the contact closed loop B is the value resulting from the combination of the partial resistance R1 of the nth sensing line 140, the partial resistance R2 of the (n+1)th sensing line 140, and the resistance R3 between the pair of sensing spacers 250 respectively contacting the nth sensing line 140 and the (n+1)th sensing line 140. Here, the resistance Rref of the connection line 145 and the resistance R3 between the pair of sensing spacers 250 may be ignored as compared to the resistance of the sensing lines 140 since the distance therebetween is very short. For example, if a display panel of the display device 1 is about 15 inches in size, the respective resistances of sensing lines 140 formed in the same direction as the data lines 130 is about 5K ohm. By comparison, the resistance Rref of the connection line 145 and the resistance R3 between the pair of neighboring sensing spacers 250 is only about 1 ohm.

The partial resistance R4 of the nth sensing line 140 of the panel of FIG. 6 is the value obtained by deducting the partial resistance R1 of the nth sensing line 130 from the resistance Ra of the nth sensing line 140. The partial resistance R5 of the (n+1)th sensing line 140 is the value obtained by deducting the partial resistance R2 of the (n+1)th sensing line 140 from the resistance Rb of the (n+1)th sensing line 140.

The sensing controller 530 detects the position of the sensing lines 140 in the first direction by comparing the resistance of the reference closed loop A and the resistance of the contact closed loop B. That is, the length of the sensing lines 140 in the first direction includes a length from the first part of the sensing lines 140 connected to the sensing controller 530 to the second part thereof. As above, the respective resistances of the sensing lines 140 is in proportion to their respective lengths. When the resistances of the reference closed loop A and the contact closed loop B are provided, the position of the contacted sensing lines 140 in the first direction can then be calculated therefrom. As above, the sensing lines 140 and the sensing spacers 250 alternate between one or more of the pixel electrodes 150. Thus, when a user presses the screen with, e.g., his or her finger or a pen, at least two sensing spacers 250 will contact a corresponding pair of sensing lines 140.

When the sensing spacers 250 contact at least two of the sensing electrodes 142 connected to a single sensing line 140, the sensing controller 530 detects the resistance of the sensing lines 140 contacting the sensing electrodes 142 closest to the sensing controller 530. That is, when the sensing spacers 250 contact the pair of neighboring sensing lines 140 and contact one of the pair of sensing lines 140 in at least two points, the contact closed loop B is formed by connecting the contact points closest to the sensing controller 530.

When the sensing spacers 250 contact three or more of the sensing lines 140, the sensing spacers 250 may select a pair of sensing lines 140 disposed in the middle of the contacted sensing lines 140 to detect the resistance. For example, when sensing spacers 250 contact three adjacent sensing lines 140, the contact closed loop B includes the sensing line 140 disposed in the middle of the three contacted sensing lines 140 and one of the remaining pair of sensing lines 140.

The sensing controller 530 detects the sensing lines 140 contacting the sensing spacers 250 and detects the position of the contacted sensing lines 140 in the second direction. In this case, the sensing controller 530 detects the sensing lines 140 contacting the sensing spacers 250 without detecting an additional resistance. The method of detecting the position of the sensing lines 140 in the second direction is equivalent to that known in the art. Thus, a detailed description thereof is omitted for brevity. The sensing controller 530 supplies position information about the detected sensing lines 140 to the signal controller 540 to perform a touch screen function.

With the foregoing configuration, the display device 1 according to the first exemplary embodiment of the present invention has a touch screen function detecting the position of the contacted sensing lines 140 in the first and second directions in which the sensing lines 140 extend only in the first direction. Thus, the first exemplary display device 1 includes sensing lines extending in only one direction, thereby improving the aperture ratio of the display and reducing its manufacturing costs, as compared to a conventional display device having intersecting sensing lines formed in both directions.

In summary, the first exemplary display device 1 of the present invention detects the resistance of the contact closed loop formed by two sensing lines 140 and sensing spacers 250 contacting each other to detect the position of the contacted sensing lines 140. The display device thus detects the position of the contacted sensing lines 140 easily and simply.

Figure 7:
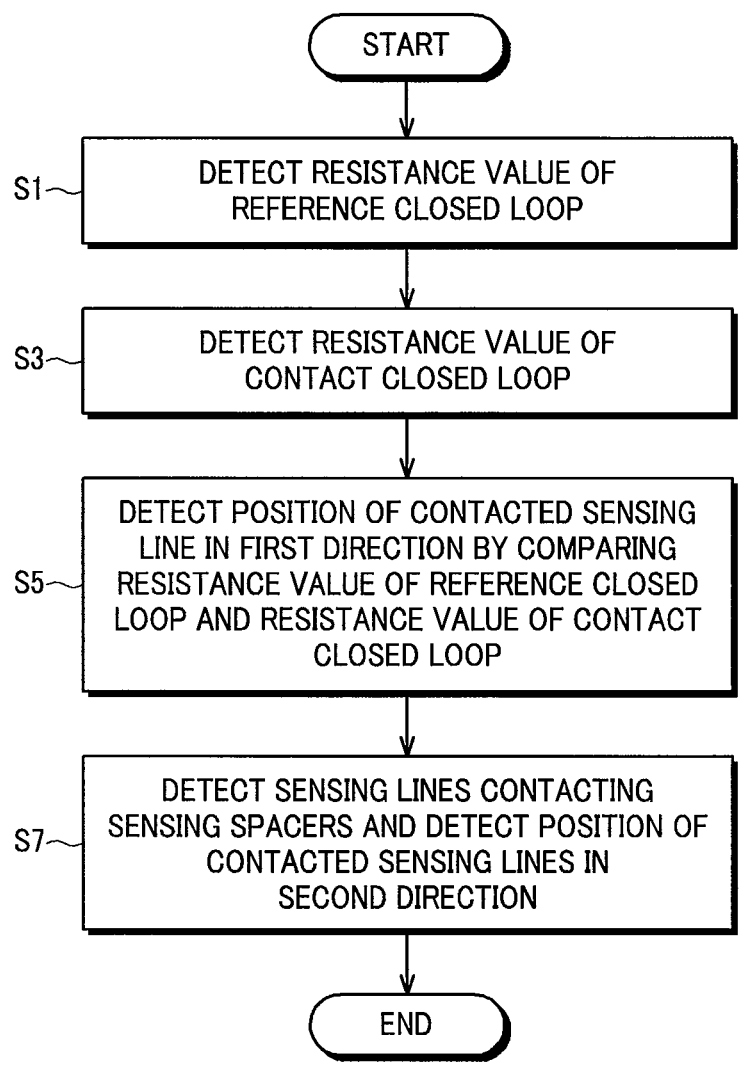
FIG. 7 is a control flowchart of the first exemplary display device.

FIG. 7 is a control flowchart of the first exemplary display device 1. A method for controlling the first exemplary display device 1 is described below with reference to FIG. 7.

The sensing spacers 250 detect the resistance of the reference closed loop A formed by the plurality of sensing lines 140 when they are not in contact with the sensing lines 140 (S1). When the sensing spacers 250 contact at least two of the sensing lines 140, the sensing controller 530 detects the resistance of the contact closed loop B formed by the two sensing lines 140 and the sensing spacers 250 contacting each other (S3). The sensing controller 530 detects the position of the contacted sensing lines 140 in the first direction by comparing the resistance of the reference closed loop A and the resistance of the contact closed loop B (S5). The sensing controller 530 detects the sensing lines 140 contacting the sensing spacers 250 to detect the position of the contacted sensing lines 140 in the second direction (S7). Here, the second direction is substantially perpendicular to the first direction. The operation (step S7) of detecting the position of the sensing lines 140 in the second direction may be performed prior to the operation of detecting the position of the sensing lines 140 in the first direction, or alternatively, may be performed simultaneously.

Second Exemplary Embodiment

Figure 8:
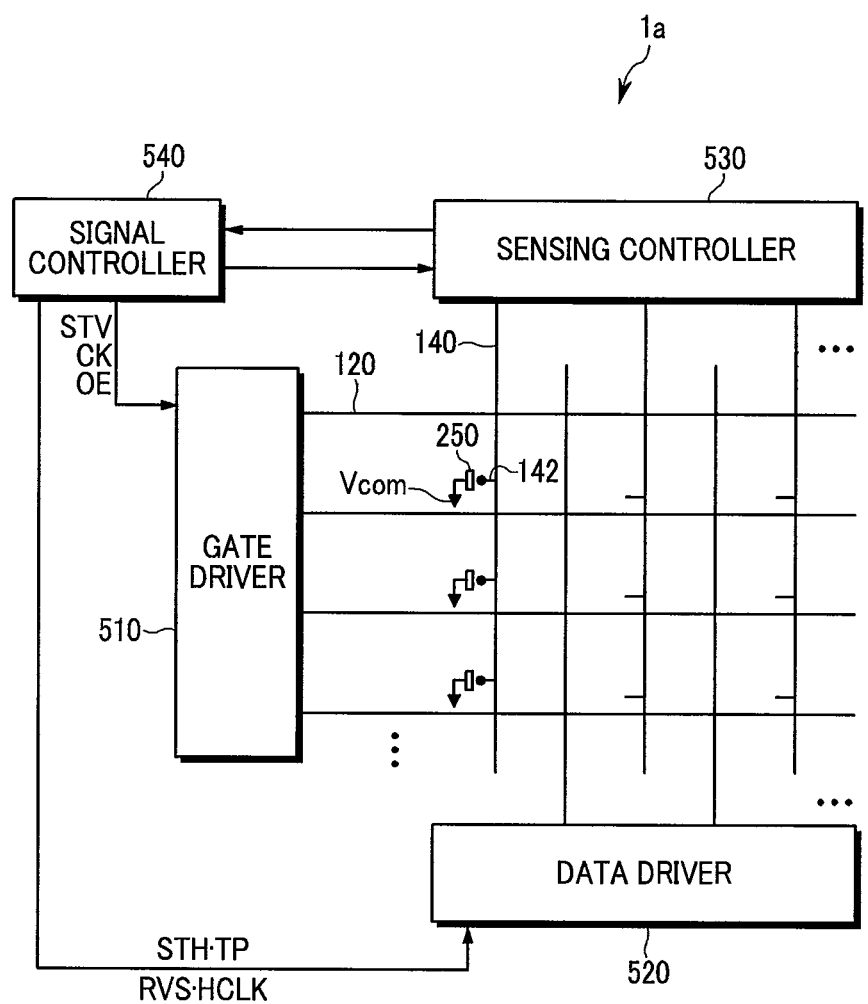
FIG. 8 is a partial schematic and control function block diagram of a second exemplary embodiment of a display device in accordance with the present invention, showing a sensing controller and a plurality of sensing lines thereof.

FIG. 8 is a partial schematic and control function block diagram of a second exemplary embodiment of a display device in accordance with the present invention. As illustrated in FIG. 8, in the second exemplary display device 1, a first part of each of a plurality of sensing lines 140 is connected to a sensing controller 530, while a second part thereof is not connected to the other sensing line. That is, the second exemplary display device 1a omits the connection line 145 of the first exemplary embodiment. Except for this difference, the elements of the second exemplary embodiment are similar to those of the first exemplary embodiment, and further detailed description thereof is therefore omitted.

Figure 9:
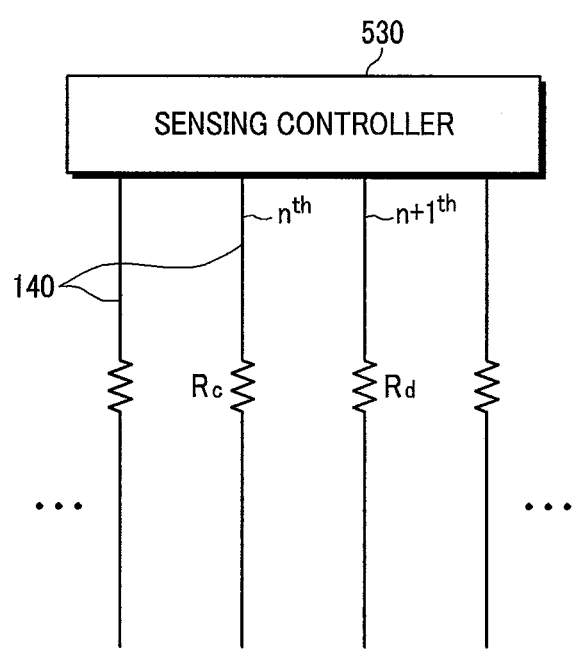
FIG. 9 is a partial schematic and control function diagram illustrating a resistance seen by the sensing controller of FIG. 8 when a sensing spacer of the display is not in contact with one of the sensing lines thereof; and, FIG. 10 is a partial schematic and control function diagram illustrating a resistance seen by the sensing controller of FIG. 8 when the sensing spacer is in contact with one of the sensing lines thereof.

FIG. 9 illustrates the resistance seen by the sensing controller of FIG. 8 when the sensing spacers 250 of the second exemplary display are not in contact with any of the sensing lines 140. As illustrated in FIG. 9, the respective second parts of the sensing lines 140 are separated from each other. In this case, the sensing controller 530 detects the resistance of two sensing lines 140 when the sensing spacers 250 are not in contact with any of the sensing lines 140. For example, the resistance of the respective sensing lines 140 may be stored in the sensing controller 530 during the manufacturing process, and the sensing controller 530 may use the stored value as the resistance of the sensing lines 140. Referring to FIG. 9, when the sensing spacers 250 contact the nth sensing line 140 and the (n+1)th sensing line 140 adjacent to it, the sensing controller 530 uses the resistance Rc of the contacted nth sensing line 140 and the resistance Rd of the contacted (n+1)th sensing line 140 stored in a storage unit (not illustrated).

Figure 10:
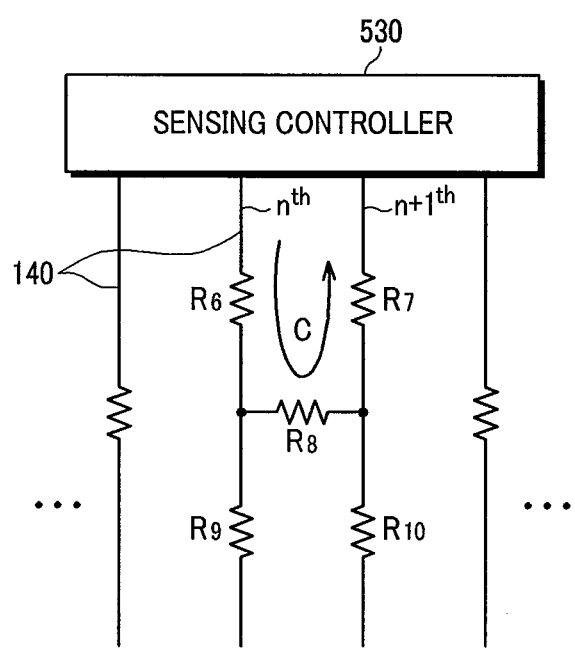

FIG. 10 illustrates the resistance seen by the sensing controller of FIG. 8 when the sensing spacers 250 of the second exemplary embodiment contact the sensing lines 140 thereof. As illustrated therein, if two sensing spacers 250 contact two neighboring sensing lines 140 by external pressure, a contact closed loop C is formed by the two sensing lines 140 and the sensing spacers 250 contacting each other. Here, the sensing controller 530 detects the resistance of the contact closed loop C. Referring to FIG. 10, the resistance of the contact closed loop C is the value obtained combining the partial resistance R6 of the nth sensing line 140, the partial resistance R7 of the (n+1)th sensing line 140, and the resistance R8 between the pair of sensing spacers 250 respectively contacting the nth sensing line 140 and the (n+1)th sensing line 140. As above, the resistance R8 between the pair of sensing spacers 250 may be ignored compared to the resistance of the sensing lines 140 since the distance between the spacers is very short. The partial resistance R9 of the nth sensing line 140 in FIG. 10 is obtained by deducting the partial resistance R6 of the nth sensing line 140 from the resistance Rc of the nth sensing line 140. The partial resistance R10 of the (n+1)th sensing line 140 is obtained by deducting the partial resistance R6 of the (n+1)th sensing line 140 from the resistance Rd of the (n+1)th sensing line 140.

The sensing controller 530 detects the position of the sensing lines 140 in the first direction by comparing the outputted resistance of the sensing lines 140 and the resistance of the contact closed loop C. That is, the length of the sensing lines 140 in the first direction includes a length from the first part of the sensing lines 140 connected to the sensing controller 530 to the second part thereof. The resistance of each sensing line 140 is in proportion to its length. If the resistances of the sensing lines 140 and the contact closed loop C are provided, the position of the contacted sensing lines 140 in the first direction can be calculated therefrom.

The sensing controller 530 detects the sensing lines 140 contacting the sensing spacers 250 to thereby detect the position of the contacted sensing lines 140 in the second direction. In this case, the sensing controller 530 detects the sensing lines 140 contacting the sensing spacers 530 without detecting an additional resistance. The method of detecting the position of the contacted sensing lines 140 in the second direction is equivalent to that known in the art. A detailed description thereof is therefore omitted.

With the foregoing configuration, the second exemplary display device 1 of the present invention has a touch screen function in which the position of the contacted sensing lines 140 is detected in both the first and second directions with the sensing lines extending in the first direction only. The second exemplary display device 1 includes sensing lines extending in one direction only, thus improving the aperture ratio of the display and reducing its manufacturing costs as compared to a conventional display device having intersecting sensing lines extending in both directions.

In sum, the second exemplary display detects the resistance of the contact closed loop formed by two sensing lines and the sensing spacers contacting each other to thereby detect the position of the contacted sensing lines. Thus, the second exemplary display device 1 detects the position of the sensing lines easily and simply. Additionally, unlike the first exemplary embodiment, the second exemplary display device does not require an additional element, such as a connection line, thereby further reducing manufacturing costs.

In accordance with the exemplary embodiments described herein, the present invention provides display devices with improved an aperture ratios and reduced manufacturing costs.

Although a number of exemplary embodiments of the present invention have been shown and described herein, as those skilled in the art will appreciate, many variations and variations can be made to these in terms of their materials, configurations and methods of construction without departing from the principles and spirit of the invention, and accordingly, the scope of the present invention should not be limited to that of the exemplary embodiments given herein, but instead, should be fully commensurate with that of the claims appended hereafter and their functional equivalents.

What is claimed is:

1. A display device, comprising:
    a first insulating substrate including a display area and a peripheral area surrounding the display area;
    a plurality of sensing lines extending exclusively in a first direction on the first insulating substrate and disposed at predetermined intervals thereon, the plurality of sensing lines being disposed on the display area;
    a second insulating substrate facing the first insulating substrate;
    a plurality of sensing spacers formed on the second insulating substrate;
    a common electrode formed on the plurality of sensing spacers and configured to make electrical contact with corresponding sensing lines in response to an external pressure applied thereto so as to create segments of sensing lines having a touch resistance;
    a plurality of gap spacers formed on areas of the second insulating substrate where portions of the common electrode have been completely removed; and
    a sensing controller configured to detect a resistance between two sensing lines when the two sensing lines are electrically connected via the common electrode formed on the plurality of sensing spacers,
    wherein a first end of each sensing line of the plurality of sensing lines is connected to the sensing controller, and a second end of each sensing line of the plurality of sensing lines is electrically connected to other second ends via a connection line so as to create a reference resistance, and
    wherein the sensing controller determines a position of a contact in the first direction by comparing touch resistance between the two segments of the sensing lines when the external pressure is applied with the reference resistance between the same two sensing lines when no external pressure is applied.

2. The display device according to claim 1, further comprising:
    a plurality of pixel electrodes formed on the first insulating substrate; and
    a plurality of gate lines and a plurality of data lines formed on the first insulating substrate and intersecting each other,
    wherein the first direction corresponds to a direction of the data lines.

3. The display device according to claim 2, wherein the connection line is formed in a same layer as the gate lines, and electrically connects the second parts of the plurality of sensing lines through a bridge, wherein the bridge is formed in a same layer as the pixel electrodes.

4. The display device according to claim 1, further comprising:
    a plurality of pixel electrodes formed on the first insulating substrate; and
    a plurality of gate lines and a plurality of data lines formed on the first insulating substrate and intersecting each other,
    wherein the first direction corresponds to a direction of the gate lines.

5. The display device according to claim 4, wherein the connection line is formed in a same layer as the gate lines, and electrically connects the second parts of the plurality of sensing lines through a bridge, wherein the bridge is formed in a same layer as the pixel electrodes.

6. A method for controlling a display device having a first insulating substrate including a display area and a peripheral area surrounding the display area, and a second insulating substrate facing the first insulating substrate, the method comprising:
    creating a reference resistance by providing a plurality of sensing lines extending exclusively in a first direction on the display area of the first insulating substrate and arranged at predetermined intervals thereon, wherein a first end of each sensing line of the plurality of sensing lines is connected to a sensing controller, and a second end of each sensing line of the plurality of sensing lines is electrically connected to other second end via a connection line;

providing a plurality of sensing spacers on the second insulating substrate;

providing a common electrode on the plurality of sensing spacers, the common electrode is configured to make electrical contact with corresponding sensing lines in response to an external pressure applied thereto;

providing a plurality of gap spacers on areas of the second insulating substrate where portions of the common electrode have been completely removed;

detecting a touch resistance between segments of the sensing lines formed by the two sensing lines electrically connected together via the common electrode when the sensing spacers touch the two sensing lines due to the external pressure; and determining a position of a contact in the first direction by comparing the touch resistance between the two segments of the sensing lines electrically connected when the external pressure is applied with the reference resistance between two sensing lines when no external pressure is applied.

7. The method according to claim 6, further comprising:
selecting two adjacent sensing lines in the middle of contacted sensing lines when more than two sensing lines are in contact with the common electrode.

8. The method according to claim 7, further comprising:
determining the position of a contact in a second direction using the detected resistance.

9. The method according to claim 6, further comprising:
determining the position of a contact in a second direction using the detected resistance.

* * * * *